United States Patent
Leiba et al.

(10) Patent No.: US 7,475,118 B2
(45) Date of Patent: Jan. 6, 2009

(54) METHOD FOR RECOGNIZING SPAM EMAIL

(75) Inventors: Barry Leiba, Cortlandt Manor, NY (US); Joel Ossher, South Salem, NY (US); Vadakkedathu Thomas Rajan, Briarcliff Manor, NY (US); Richard Segal, Chappaqua, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/347,492

(22) Filed: Feb. 3, 2006

(65) Prior Publication Data

US 2007/0185960 A1 Aug. 9, 2007

(51) Int. Cl.
*G06F 15/16* (2006.01)
(52) U.S. Cl. ...................... 709/206; 709/224
(58) Field of Classification Search ......... 709/200–206, 709/217–227
See application file for complete search history.

(56) References Cited

U.S. PATENT DOCUMENTS

| 7,206,814 | B2 * | 4/2007 | Kirsch | 709/206 |
| 7,366,761 | B2 * | 4/2008 | Murray et al. | 709/206 |
| 2005/0080857 | A1 * | 4/2005 | Kirsch et al. | 709/206 |
| 2005/0091319 | A1 * | 4/2005 | Kirsch | 709/206 |
| 2005/0091320 | A1 * | 4/2005 | Kirsch et al. | 709/206 |

* cited by examiner

*Primary Examiner*—Moustafa M Meky
(74) *Attorney, Agent, or Firm*—Michael J. Buchenhorner; Vazken Alexanian

(57) ABSTRACT

A method includes steps of receiving an email message comprising a plurality of packets and delivery-path information; determining a path for the email using the delivery-path information; comparing the path with a plurality of prior email paths; determining a measure of similarity between the path of the email received and one or more of the plurality of prior email paths; and determining a spam score for the email received, based on the measure of similarity. Other embodiments include a computer readable medium comprising computer code for performing the above function and an information processing system including a processor configured (i.e., hard-wired or programmed) to perform the method.

1 Claim, 2 Drawing Sheets

100

METHOD FOR RECOGNIZING SPAM EMAIL

FIELD OF THE INVENTION

The invention disclosed broadly relates to the field of information processing systems, and more particularly relates to the field of unsolicited electronic mail.

BACKGROUND OF THE INVENTION

Junk e-mail (spam) is an ever-increasing problem on the Internet, continually requiring new solutions. Existing mechanisms used to attack spam use analysis of individual mail delivery transactions such as SMTP (simple mail transfer protocol) analysis, analysis of mail addressing headers ("from," "to," "sender," and others), and analysis of the subject and/or contents of the mail. While these mechanisms are effective to a large extent, spammers have learned how to get past them, and continue to improve their techniques. Popular mechanisms and ideas that currently exist in this area include:

(1) DNS (domain name server) block lists—these are lists of IP addresses of mail agents that are "known" to send spam; receiving mail servers can check these lists and refuse to accept mail from agents that appear there. These are reactive, static lists, which are maintained by spam complaints. They suffer from maintenance difficulty (reputable senders, including major companies and service providers, frequently find themselves on these lists erroneously, and often have trouble getting off them).

(2) SPF (Sender Permitted From or Sender Policy Framework), Sender-ID, CSV (Certified Server Validation), Domain Keys, and related proposals—these are all techniques designed to confirm that the sender of the mail is not trying to lie about its identity. That is, they each define the "sending domain" and provide a mechanism for domains to publish information that allows recipients to determine whether a message that seems to have a specific "sending domain" came from an agent authorized to send mail on that domain's behalf. With sufficient adoption, these can be effective for "white listing" but cannot be used to detect spam. In fact, many spam domains are participating in SPF, presumably hoping that such participation will give them credibility.

Mechanisms to validate the sending domain of an email message are becoming popular, standardized, and hotly debated. The goals of SPF, Caller-ID, and Sender-ID are basically the same: they are each designed to prevent "spoofing" by making it possible for domain owners to publish a list of valid outgoing email servers. Messages that pass one of these tests can be reliably associated with a domain that participated in the delivery of the message for some value of "reliably" that is the subject of much debate and controversy. "Plausibly" might be a better characterization, as these techniques are meant to be "best effort" validations.

However, this information is not sufficient to filter spam. In addition to knowing a responsible domain, spam filtering requires information about what domains send spam. Most proponents of domain authentication therefore suggest combining domain authentication with reputation services.

SPF lets a domain declare its outgoing e-mail gateways. All mail from that domain "should" pass through those gateways, if the SPF information is correct. If a message passes an SPF check, and we can assume the domain principally does not send spam, then it is safe to pass that mail directly on to a user. But since spammers, too, have registered domains and published SPF records, we cannot assume that mail that passes SPF validation originated from a non-spam domain.

Therefore, there is a need for a method and system that analyzes email elements that are beyond the control of spammers and overcome the above shortcomings.

SUMMARY OF THE INVENTION

Briefly, according to an embodiment of the invention, a method includes steps of receiving an email message comprising a plurality of packets and delivery-path information; determining a path for the email using the delivery-path information; comparing the path with a plurality of prior email paths; determining a measure of similarity between the path of the email received and one or more of the plurality of prior email paths; and determining a spam score for the email received, based on the measure of similarity. Other embodiments include a computer-readable medium comprising computer code for performing the above function and an information processing system including a processor configured (e.g., hard-wired or programmed) to perform the method.

DETAILED DESCRIPTION

Figure 1:
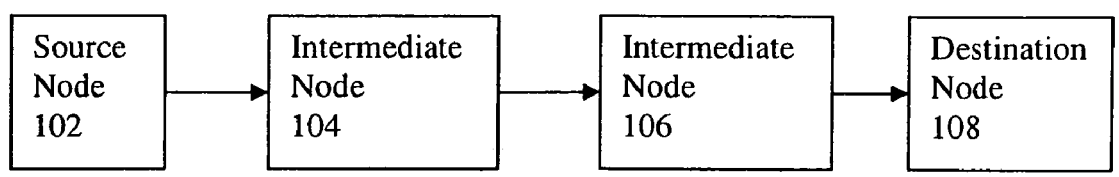
FIG. 1 is a high level block diagram representing a simplified email message path.

Referring to FIG. 1 we show a highly simplified block diagram of an email infrastructure 100. A sender node 102 transmits an email message to a destination node 108. The email message is routed to the destination node 108 by routers 104 and 106. Each router adds information to the email message such that the message comprises an indication of the path of the email from node 102 to node 108. An embodiment of the invention analyzes the information stored in an email message about the path that the message took through the Internet mail delivery infrastructure. Once the message leaves a spammer's control, delivery-path information is added to the message, which information cannot be removed by the spammer. By analyzing this information, and learning the spam and non-spam patterns of the different delivery channels, we are able to detect spam that cannot be detected by content analysis or other existing techniques. An advantage of the embodiments of this invention over prior attempted solutions to spam detection is that a system using our invention learns dynamically from the delivery-path information in the actual messages, requires no "participation" by other parties, and is able to identify delivery paths as "spammy", as well as identifying some as "good".

Figure 2:
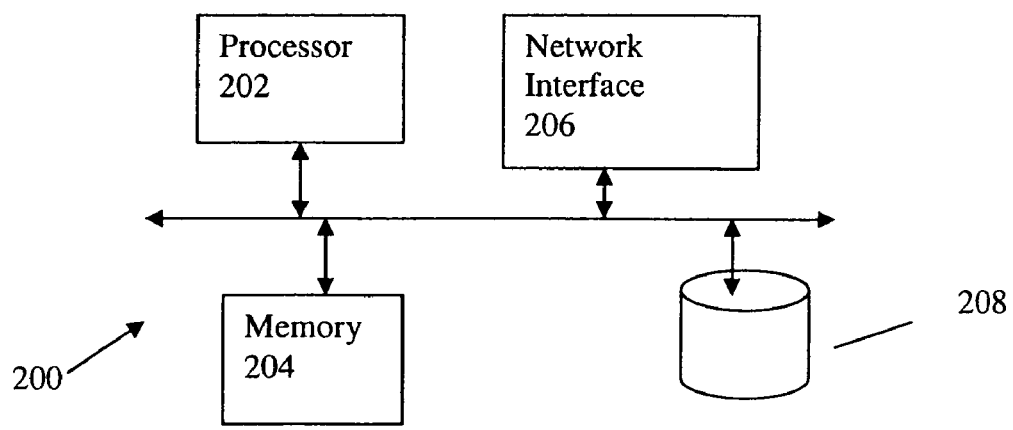
FIG. 2 is a high level block diagram showing an information processing system according to another embodiment of the invention.

This embodiment works by analyzing the standard "received" lines in Internet message headers, extracting from them the list of IP addresses and mail domains through which the message purportedly passed, and comparing this information with a learned database of delivery paths. Referring to FIG. 2, we show a simplified block diagram of an information system 200 using an embodiment of the invention. The system 200 comprises a processor 202, a system memory 204, a network interface 206 and a database 208. The database 208 either can be a part of the system 200 or can be remotely coupled to the system 200 via the network interface 206. The system 200 receives email messages through the network interface 206. It then analyzes the path information within the email message to determine whether to route it to the destination. The processor 202 is configured (e.g., hard-wired or programmed) to extract the path information and compare it with path information from previously analyzed emails. The system 200 learns about its initial database by being trained on a starting set of sorted messages, spam and non-spam; it continues to learn throughout its operation by receiving "votes" from end-user recipients who tell it about new messages that they receive. The addresses from each message are ordered according to judgments of their reliability, each is given a score based on the spam and non-spam that have come from that address, and a combination of these results in an overall score for the message. This score can then be used alone, or in combination with other message classifiers, to determine a disposition of the message.

In evaluating each address and giving it a score, we use an "aggregation" algorithm. The aggregation is an ad-hoc one, performed without direct knowledge of assigned network topology, but, rather, done by combining portions of the IP addresses directly. In the IPV4 system, over which Internet mail currently travels, IP addresses comprise four bytes each, and assignments are made hierarchically. Using only that information, a database 208 can be created for collecting information for each IP address, and for connecting that address and its data with all those sharing successive higher-level bytes. For example, the address represented as "64.233.161.99" would have its information aggregated with all those starting with "64.233.161", which, in turn, would be aggregated with those starting with "64.233". The database 208 maintains this information sparsely (so that the addresses do not result in wasted space), and the result is efficient, and is also effective at finding patterns in spam-sending and non-spam-sending. Other "aggregation" methods, such as those using domain ownership (e.g., listed under who is) can also be used.

For each address (and aggregate) we keep the number of spam and non-spam messages received from that address (or aggregate) during the training phase, augmented by the votes received during the operational phase. During operation, we evaluate each address by finding its node in the database, along with its parent node and nodes that are "near" to it, as determined by the aggregation. This produces a score for that address.

After evaluating each address starting with the most recent, we accumulate a weighted average, giving more weight to exact database-matches than to those that were obtained only from other "nearby" addresses. We detect and eliminate fake information, and the result is a score for the message as a whole. This score can be used alone, or can be combined with scores obtained from content analysis or other anti-spam techniques, to determine final disposition of the message.

Figure 3:
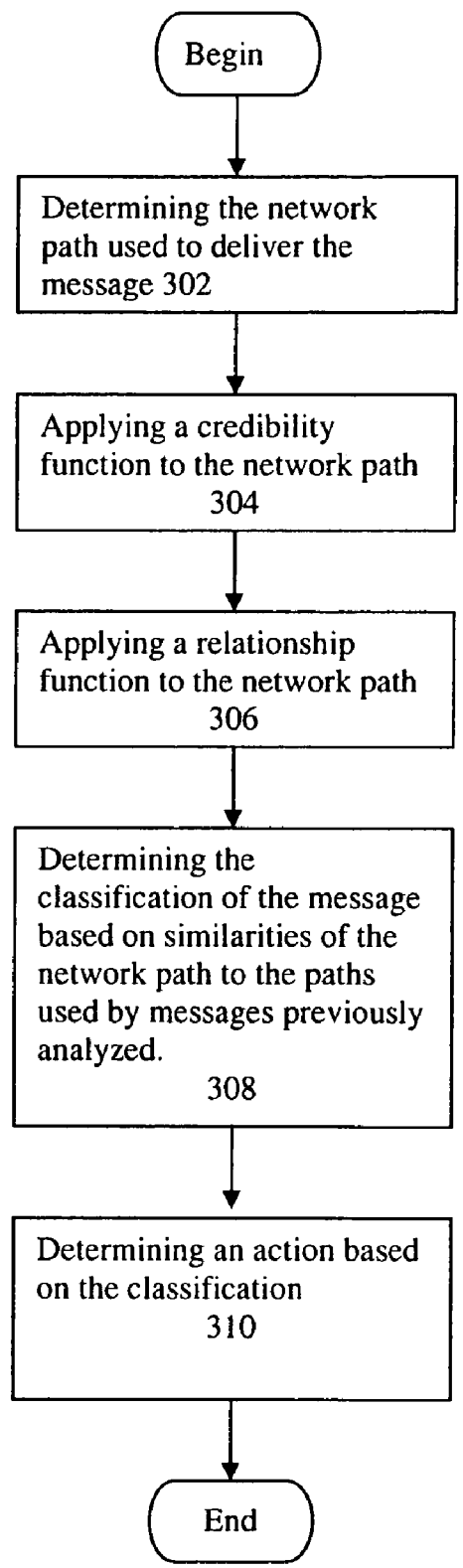
FIG. 3 is a flowchart of a method according to an embodiment of the invention.

Referring to FIG. 3, we discuss a computer-implemented method 300 for classifying an electronic message according to an embodiment of the invention. The method 300 can be implemented by any node in an email network that controls a routing "hop."

Step 302 determines the network path used to deliver the message. This may include extracting the delivery path from the message headers. Optionally, the message can conform to RFC 2822 and the network path is extracted from the "RECEIVED" headers.

Step 304 applies a credibility function to the network path to determine the credibility of the nodes along the path from which the email message was received. The step of applying the credibility function can comprise: considering each node in the network path separately; determining a preliminary credibility for each node; using that preliminary credibility, and the credibilities of one or more other nodes in the path, to determine the credibility of that node. The step of determining the preliminary credibility may comprise counting the frequency of messages of each classification that were previously sent by each node. Each node can be represented by its IP address.

Step 306 applies a relationship function to the network path. Step 308 determines the classification of the message based on similarities of the network path to the paths used by messages previously analyzed. Step 310 determines an action to take on the email message based on the analysis of the path (e.g., delete as spam, deliver to the user's inbox, or deliver to an alternative destination, such as a "suspected spam" mailbox). Step 310 can comprise examining the nodes from most recent to earliest and assigning each node a credibility no better than that of the previously examined node.

The method 300 may include an additional condition that a node with insufficient history for an adequate count in the counting step is given low credibility. The method the preliminary credibility can be determined by examining information published by a reference domain determined from the message.

The relationship function compares each previously unseen node with known nodes with similar IP addresses. IP addresses that match in their high-order bits and IP addresses that have the same owner can be considered similar.

The relationship function compares each previously unseen node with known nodes with similar domain names. Nodes with a partial match in the domain-name hierarchy are considered similar. The nodes whose domain-names have the same owner are considered similar.

According to another embodiment, we discuss a method for learning the reputation of email domains and IP addresses based on analyzing the paths used to transmit known spam and known good mail. This information is combined with a method for filtering spoofed mail headers to ensure that spammers cannot circumvent the route classification analysis.

The method discussed uses only the IP addresses mentioned in the standard "received" lines from the headers of an email message to classify the message as spam or not. It implements a learning algorithm, in that we assume the algorithm is trained on a representative set of previously classified mail with the corresponding IP addresses selected. Mail from the same or similar IP addresses is likely to share the same classification.

To accurately label sites for which there is little data, we can use a classifier using another technology such as native Bayes or Chung-Kwei, which can distinguish more accurately. For instance, while SMTP Path Analysis is not as accurate as the commonly employed Bayesian spam classifiers, it recognizes information that Bayesian classifiers handle at best generically, and on those parts of that space it does better. Its results can be used to correct erroneous evaluations from a Bayesian classifier, while the Bayesian classifier can classify examples for which there is insufficient data for effective path analysis. An aggregate classifier using both results can be better than either.

The method described here uses the IP addresses directly and establishes their reputations, sometimes based on nearby IP addresses, rather than grouping them by an external set of declarations and learning the reputation of the groups. The chief advantages that SPF has in this regard are: SPF can group disparate address ranges into a single entity, so loss information is needed to create a reputation for that grouping; and SPF tells explicitly where the boundaries of the ranges are.

SPF (Sender Permitted From) might claim another advantage, in that it can, if the purported sending domain publishes SPF records, distinguish mail that goes through legitimate gateways from mail sent directly from a zombie to the Internet. However, our algorithm is actually good at recognizing legitimate gateways and sorting out mail coming directly from zombie machines (or "botnets"), so this advantage is less than it might appear to be. The SPF information could clearly be used in conjunction with our algorithm when available, and when not, the algorithm stands on its own. Note also that, while SPF can't tell anything if the purported sending domain does not publish SPF records, our algorithm can learn from a delivery path regardless of what domain is claimed as the source of the message.

The SMTP protocol specifies that each SMTP relay used to send an email message must add at the beginning of the message's header list a "received" line that contains (at least) information about the SMTP server receiving the message, from where the server received the message, and a timestamp stating when the header was added. These header lines, taken together, provide a trace of the SMTP path used to deliver a message.

However, the SMTP path listed in a message's received header cannot be fully trusted. The message headers are not signed or authenticated in any way and therefore are easily spoofed. Any SMTP server along the path can insert fake headers that make the message appear to come from any path the sender chooses.

Still, some received line headers are reliable. For instance, all headers that were added by a user's own domain's inbound SMTP servers can be trusted. A site may also trust the received lines produced by organizations with whom it regularly does business, assuming they can identify the outbound servers of those organizations. But once the SMTP path implicit in the received lines reaches an unknown or untrustworthy server, the remainder of the purported SMTP path cannot be trusted.

SMTP Path Analysis works by learning about the spamminess or goodness of IP addresses by analyzing the past history of e-mail sent using that IP address. The algorithm's learning phase takes as input a set of pre-classified messages that are labeled as spam or non-spam. The learning algorithm extracts from each message the sequence of IP addresses that mail supposedly took to get to the recipient and collects statistics about each IP address. During its classification phase, the algorithm extracts the IP address sequence from the target message and yields a score for that message based on the IP addresses of the gateways supposedly used to deliver the message. The score can be subjected to a threshold to yield a classification of spam or not, or can be used as input to an aggregate classifier. The algorithm looks at no other information; in particular, it does not otherwise analyze the content of the message nor consider any domain information.

In the most basic form of our method, the statistic collected for each IP address is simply the number of spam and non-spam e-mails for which it appears. These counts are then used to estimate the probability that mail passing through any previously-seen IP address is spam. The probability estimates are smoothed as necessary to correct for small sample sizes. During classification, we look at the sequence of IP addresses used to deliver the message and assign the message a spamminess score based on the last IP address in the chain for which we have sufficient data.

There are two problems that must be fixed before the above outline of an algorithm is even plausible:
1. Many machines (particularly those at the beginning of the chain, which may be zombies or spammers connecting to their service providers) do not have fixed IP addresses, so the odds of seeing the same IP address in the training set as the one in the message we are trying to classify is lower than desired.
2. The above. technique is susceptible to spoofing. That is, the message may be coming from a spammy IP address and the machine there may claim that it is passing on a message from a legitimate sender.

We address the dynamic IP issue by combining statistics of the current IP address with those of "nearby" IP addresses whenever there is not sufficient data for the current IP address to make a reliable decision. There are many possible definitions of "nearby" that can be used for this purpose. One solution is to build a tree of IP addresses that we've seen so far. The root of the tree has up to 256 sub trees, each corresponding to the various possible first bytes of an IP address. For efficiency, we make the tree sparse, so first-bytes that we have not yet encountered do not appear in the tree. This sparseness continues in all branches of the tree.

Each of those sub trees in turn has up to 256 sub trees itself, each corresponding to the second-byte. The same is done for the third and fourth-bytes, though, of course, as we go down the tree the branching becomes sparser, yielding a tree with many fewer than 232 nodes.

At each node n we store the number of spam messages, Sn and the number of non-spam messages NSn in which that IP address or range the node represents has appeared. A ratio is computed that is a measure of how spammy the node is, which is $S_n/(S_n+NS_n)$: the number of spam messages divided by the total number of messages that have come through this address or range.

We cannot just use that ratio as it is. Again, there are two issues:
1. What we are trying to record at an interior node is information that will be helpful if we get an IP address with no exact match below that node. That value should be influenced by what happens at the average IP sub range, not what might happen at a few specific IP addresses in those ranges. This may be particularly important in cases where certain addresses are used by spammers but the range as a whole is not, and so we average the activity of the child nodes, not weighted by the quantity of mail that passes through them.
2. If a node has seen only one piece of spam and no non-spam, the odds of the next piece of mail being spam are not 100%.

We solve both problems by the way we actually calculate the score for that IP address. We add an artificial new root with a score of 0.5. We repeatedly go to the sub-tree that contains the actual IP address if one is available. At that subtree we compute an average of the children of that sub-tree and the parent. That is. if there are nine children we take the average of ten nodes; the parent and the nine children, For the leaf nodes we take the average of the parent and ratio for the leaf node weighted by the number of messages containing the leaf. Of course, sometimes we do not reach a leaf node if we have never seen this exact IP address in our training set. When we get a new message, we look at each IP address, starting with the last one—the one closest to our receiving machine. We compute its score, a number between 0 and 1, and then combine that with the score for the next IP address. We take a weighted average of the spamminess of the two IP addresses, with weight equal to $1/(s*(1-s))$, where s is the spamminess described above. The rationale is that an IP address that is strongly spammy or strongly non-spammy in the sequence is a better indicator of the nature of the message mail—that the addresses with the most extreme scores are the ones that are most significant to the computation. We continue this process of combining the present average to the spamminess of the next IP address until we reach the end of the list.

As noted above, the above technique is susceptible to spoofing. If a spammer spoofs to foil our algorithm, the mail will appear to come from a legitimate source through a spammy address. To address this problem, we establish a credibility value for each intermediate address, and if an address is not credible we can at least partially ignore the remaining addresses.

In practice, if there is any IP address in the sequence that matches exactly an IP address in the training set, it is a better indicator than the score given above when we only find an interior node. So we give more weight to the exact matches.

There is a distinction between an address that originated messages and one that acts as a gateway, and we keep separate statistics for originating addresses and intermediate addresses. Consider as an example, an enterprise that when it developed its corporate Internet presence, most users in a division, who had had Internet email addresses for some time before, moved slowly from gateways inside the division to enterprise-wide gateways. As spam has increased, the division's gateways were rarely used for legitimate mail—98% of what moved through one of those gateways was spam, but some division employees still continued to use it. Hence, mail that goes from there to other parts of the enterprise would be labeled as probable spam, based on the analysis of the received lines. This can be fixed by keeping statistics for the last IP address (the supposedly originating site) separate from all others. So, if an address range receives much spam, but all mail originating near it is good, then it will be given a good score.

Therefore, while there has been described what is presently considered to be the preferred embodiment, it will understood by those skilled in the art that other modifications can be made within the spirit of the invention.

What is claimed is:

1. A computer-implemented method comprising:
   creating a learned database for storing a plurality of email paths by:
      training a starting set of sorted email messages comprising spam and non-spam messages;
      storing a starting spam score for each IP address stored in the learned database, wherein spam scores indicate a likelihood that an email received is spam;
      combining portions of the IP addresses as they are stored;
      aggregating IP addresses, based on domain ownership;
   updating the learned database by receiving votes from users receiving emails, wherein each vote indicates whether the user regards the email to be spam or non-spam;
   after evaluating each address starting with the most recent, accumulating a weighted average, and giving more weight to exact database matches than to those that were obtained only from other nearby addresses;
   receiving an email message comprising a plurality of packets, delivery-path information comprising an email message header comprising received lines, and at least one recipient for the email message;
   analyzing the received lines in the email message header, comprising:
      extracting from the received lines a list of IP addresses and mail domains through which the email purportedly passed;
      comparing the IP addresses with the learned database of delivery paths comprising IP addresses along each delivery path;
      determining a network path for the email using one or more elements of the delivery path information;
   applying a credibility function to the network path followed by the email message, comprising:
      considering each node in the network path separately;
      determining a preliminary credibility for each node, comprising counting the frequency of messages of each classification that were previously sent by each node;
      using that preliminary credibility, and the credibility of one or more other nodes in the path, to determine the credibility of that node by examining the nodes from most recent to earliest and assigning each node a credibility no better than that of the previously examined node;
      wherein a node with insufficient history for an adequate count in the counting step is given low credibility;
   applying a relationship function to the network path followed by the email message;
   comparing the network path with a plurality of prior email paths;
   determining a measure of similarity between the path of the email received and one or more of the plurality of prior email paths;
   determining a spam score for the email message received, based on the measure of similarity;
   detecting and eliminating fake information, and providing a score for the message as a whole; and
   not forwarding the email message to the at least one recipient when the email message is determined to comprise spam.

* * * * *